(12) United States Patent
Lin

(10) Patent No.: US 9,334,679 B2
(45) Date of Patent: May 10, 2016

(54) ADJUSTABLE DEVICE HOLDER

(71) Applicant: CHEN-SOURCE INC., Taoyuan County (TW)

(72) Inventor: Sung-Ching Lin, Taoyuan County (TW)

(73) Assignee: CHEN-SOURCE INC., Guishan Township, Taoyuan County (TW)

( * ) Notice: Subject to any disclaimer, the term of this patent is extended or adjusted under 35 U.S.C. 154(b) by 141 days.

(21) Appl. No.: 14/152,220

(22) Filed: Jan. 10, 2014

(65) Prior Publication Data

US 2015/0196140 A1 Jul. 16, 2015

(51) Int. Cl.
*A47F 5/00* (2006.01)
*E05B 73/00* (2006.01)
*F16M 13/02* (2006.01)
*A47F 7/024* (2006.01)

(52) U.S. Cl.
CPC ............ *E05B 73/0082* (2013.01); *A47F 7/0246* (2013.01); *F16M 13/02* (2013.01); *F16M 2200/02* (2013.01)

(58) Field of Classification Search
USPC .............. 248/917, 919, 921, 922, 923, 316.1, 248/316.2, 309.1, 924; 379/446; 361/679.56, 679.58
See application file for complete search history.

(56) References Cited

U.S. PATENT DOCUMENTS

| | | | | | |
|---|---|---|---|---|---|
| 5,555,302 | A | * | 9/1996 | Wang | 379/446 |
| 5,788,202 | A | * | 8/1998 | Richter | 248/316.4 |
| 5,836,563 | A | * | 11/1998 | Hsin-Yung | 248/316.4 |
| 6,285,758 | B1 | * | 9/2001 | Lu | 379/446 |
| 7,272,984 | B2 | * | 9/2007 | Fan | 74/89.17 |
| 7,407,143 | B1 | * | 8/2008 | Chen | 248/309.1 |
| 7,537,190 | B2 | * | 5/2009 | Fan | 248/309.1 |
| 8,567,737 | B2 | * | 10/2013 | Chen | 248/316.2 |
| 8,638,557 | B2 | * | 1/2014 | Tsai | 361/679.56 |
| 2006/0215836 | A1 | * | 9/2006 | Wang | 379/455 |
| 2007/0262223 | A1 | * | 11/2007 | Wang et al. | 248/346.07 |

* cited by examiner

*Primary Examiner* — Steven Marsh
(74) *Attorney, Agent, or Firm* — Muncy, Geissler, Olds & Lowe, P.C.

(57) ABSTRACT

An adjustable device holder includes a holder base including a bottom panel, a cover panel covering the bottom panel, two parallel sliding grooves located on the bottom panel and a shaft column located at the bottom panel between the sliding grooves, and an adjustment module including two adjustment plates slidably coupled to the sliding grooves and having a respective integrated tooth rack, two clamping members respectively pivotally connected to the adjustment plates for holding a mobile electronic device therebetween and a rotating wheel coupled to the shaft column of the holder base and having an integrated external ring gear meshed between the tooth racks of the adjustment plates.

8 Claims, 6 Drawing Sheets

ADJUSTABLE DEVICE HOLDER

BACKGROUND OF THE INVENTION

1. Field of the Invention

The present invention relates to a device holder mountable in an exhibition rack or any other support means for holding a mobile electronic device, and more particularly to an adjustable device holder that is conveniently adjustable subject to the size of the mobile electronic device to be held.

2. Description of the Related Art

With fast development of electronic technology, advanced and sophisticated electronic devices have been continuously created and widely used in offices, homes, and other recreational and entertainment places for different applications. Among various electronic products, mobile electronic devices are widely invited by people for the advantages of small size, light weight and high mobility.

With continuous creation of hardware and software functions, mobile electronic devices, such as smart phones, tablet computers, notebook computers, PDAs and etc. are widely used in our daily life for communication, word processing, internet data searching and many other purposes. Newly created mobile electronic products are exhibited in stores or exhibition centers for field trials and selection.

Further, different exhibition racks are commonly installed in stores or exhibition centers for holding mobile electronic devices for field trials, selection and/or exhibition. However, for holding various types and models of mobile electronic devices having different dimensions, different sizes of exhibition racks must be used. Further, it is expensive to install different sizes of exhibition racks in a store or exhibition center. Further, conventional exhibition racks are simply designed for holding mobile electronic devices for exhibition without providing any security measures. Mobile electronic devices exhibited in exhibition racks are easily stolen by an evil person.

SUMMARY OF THE INVENTION

The present invention has been accomplished under the circumstances in view. It is the main object of the present invention to provide an adjustable device holder, which is highly adjustable for holding any of different sizes of mobile electronic devices.

To achieve this and other objects of the present invention, an adjustable device holder of the invention comprises a holder base and an adjustment module. The holder base comprises a bottom panel, a cover panel covering the bottom panel, an accommodation chamber defined between the bottom panel and the cover panel, two access holes respectively disposed in communication between the accommodation chamber and the atmosphere at two opposite lateral sides, two parallel sliding grooves located on an inner wall of the bottom panel and a shaft column located at the bottom panel between the two parallel sliding grooves. The adjustment module comprises two adjustment plates, two pivot joints, two clamping members respectively pivotally connected to the adjustment plates by the two pivot joints for holding a mobile electronic device therebetween, and a rotating wheel coupled to the shaft column at the bottom panel of the holder base and having an integrated external ring gear. Further, each adjustment plate comprises two parallel sliding rails respectively slidably coupled to the parallel sliding grooves at the bottom panel of the holder base, an extension arm forwardly extended from a front end thereof, and a tooth rack formed integral with and extending along an inner side of the extension arm. The external ring gear of the rotating wheel is meshed between the tooth racks of the adjustment plates of the adjustment module. Thus, the two adjustment plates can be moved along the parallel sliding grooves at the bottom panel of the holder base relative to each other to adjust the gap between the two clamping members subject to the size of the mobile electronic device to be held, enabling the mobile electronic device to be firmly secured in the clamping holes of the clamping members.

Further, operating a knob of a control member of the holder base can tightly stop a push rod of the control member against a pressure surface of a positioning member to keep an engagement portion of the positioning member in abutment against engagement portions of the adjustment plates of the adjustment module tightly, preventing disengagement between the clamping members of the adjustment module and the loaded mobile electronic device.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
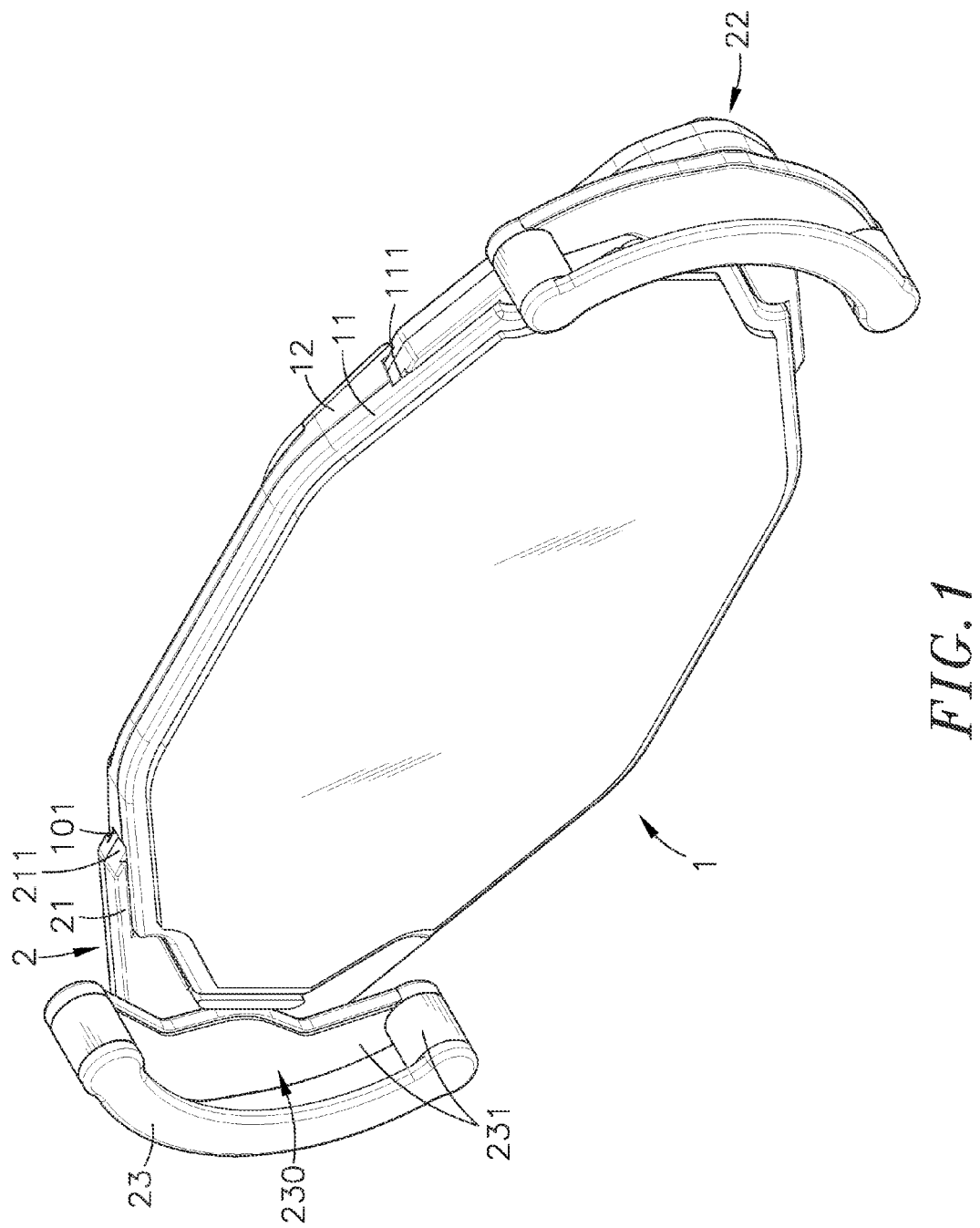
FIG. 1 is an oblique top elevational front view of an adjustable device holder in accordance with the present invention.
Figure 2:
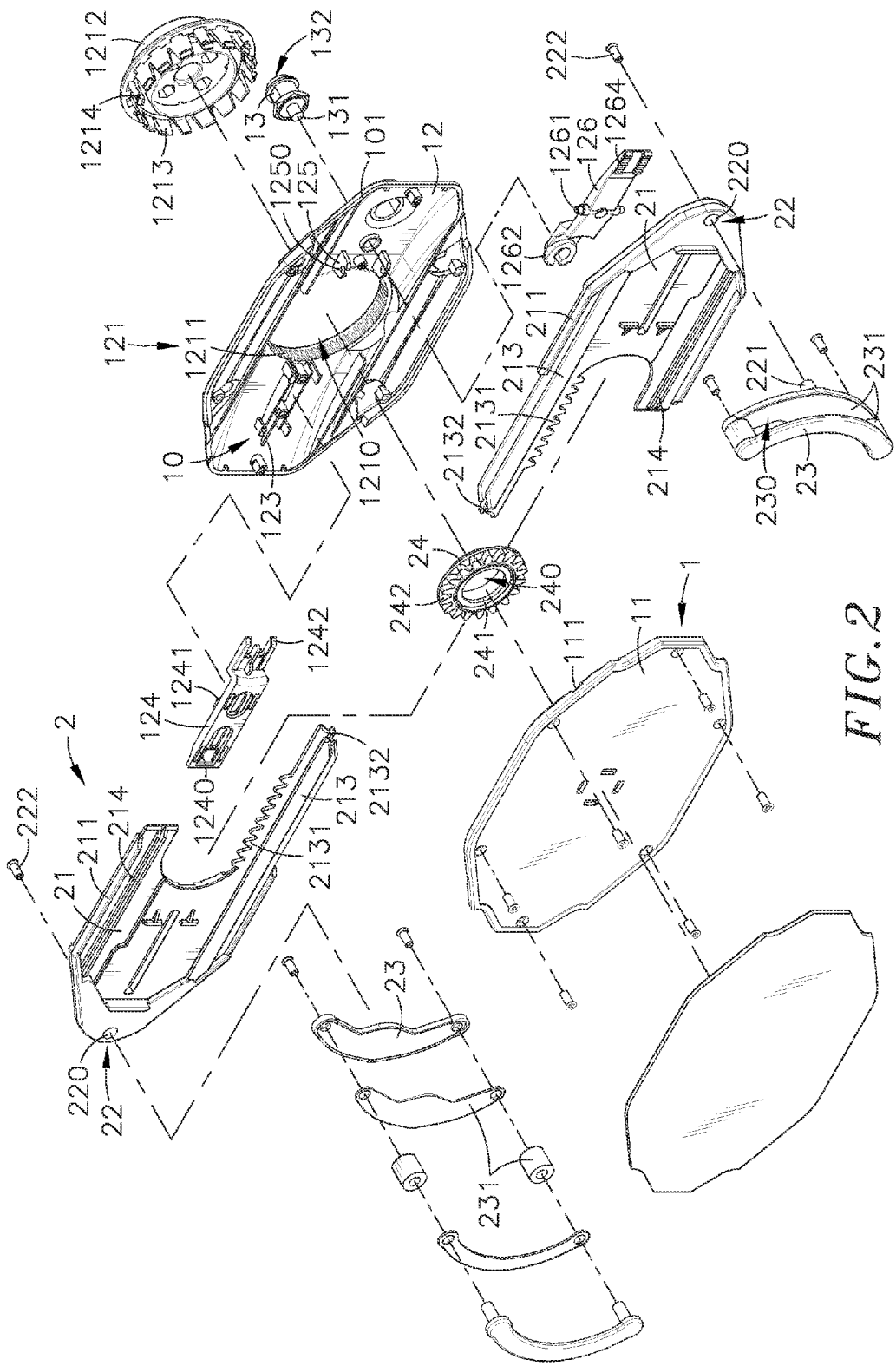
FIG. 2 is an exploded view of the adjustable device holder in accordance with the present invention.
Figure 3:
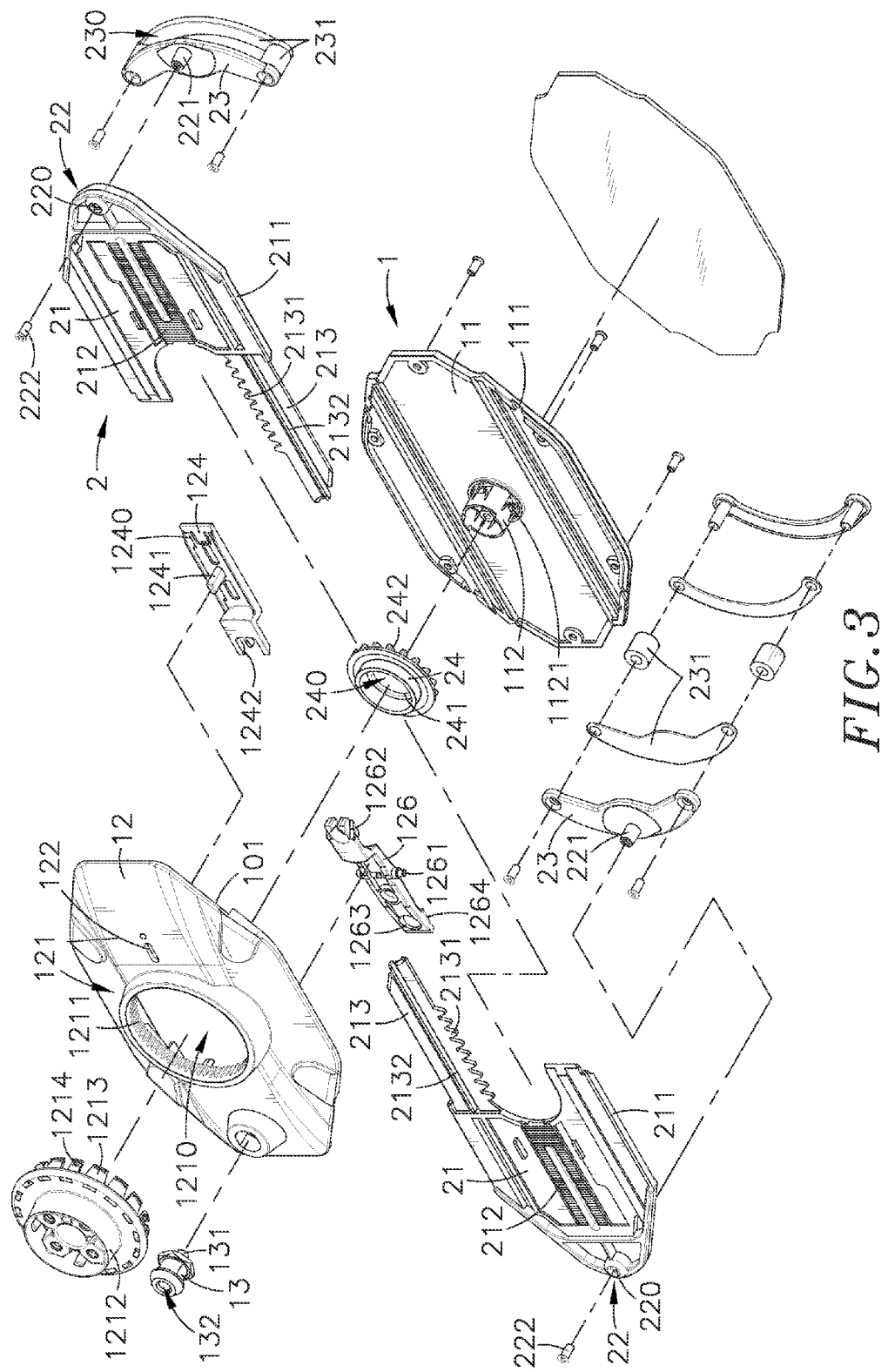
FIG. 3 corresponds to FIG. 2 when viewed from another angle.

Referring to FIGS. 1-3, an adjustable device holder in accordance with the present invention is shown. The adjustable device holder comprises a holder base 1, and an adjustment module 2.

The holder base 1 comprises a bottom panel 11, a cover panel 12 covering the bottom panel 11, an accommodation chamber 10 defined between the bottom panel 11 and the cover panel 12, two access holes 101 respectively disposed in communication between the accommodation chamber 10 and the atmosphere at two opposite lateral sides, and a control member 13. The bottom panel 11 comprises a shaft column 112 located at the center of an inner wall thereof, a plurality of stop blocks 1121 spaced around the periphery of the shaft column 112, and two parallel sliding grooves 111 located on the inner wall at two opposite sides relative to the shaft column 112 in a parallel manner. The cover panel 12 is smoothly arched, comprising a mounting structure 121 located at the center, an operating hole 122 cut through opposing top and bottom walls thereof and disposed adjacent to one lateral side of the mounting structure 121, a plurality of engagement blocks 123 located on the bottom wall at two opposite sides of the operating hole 122 in a parallel manner and projecting into the accommodation chamber 10, a bottom release member 124, which comprises an operating rod 1241 inserted through the operating hole 122 to the outside of the cover panel 12, a plurality of sliding slots 1240 respectively slidably coupled to the engagement blocks 123 and a press portion 1242 extended from a front side thereof and suspending in a bottom side relative to the mounting structure 121, two locating plates 125 extended from the bottom wall adjacent to an opposite lateral side of the mounting structure 11 and respectively defining a respective pivot hole 1250, a positioning member 126, which comprises two pivot rods 1261 symmetrically disposed at two opposite lateral sides thereof and respectively pivotally coupled to the pivot holes 1250 of the locating plates 125, a bearing portion 1262 located at a front end thereof, and a pressure surface 1263 and an engagement portion 1264 respectively located at opposing top and bottom sides of an opposing rear end thereof. The control member 13 is inserted through the cover panel 12, comprising a push rod 131 extended from a bottom side thereof and stopped against the pressure surface 1263 of the positioning member 126 and a knob 132 located at a top side thereof and suspending outside the cover panel 12.

The adjustment module 2 comprises two adjustment plates 21, two pivot joints 22, two clamping members 23, and a rotating wheel 24. The two adjustment plates 21 are arranged in a symmetric manner, each comprising two parallel sliding rails 211, an engagement portion 212 disposed on the middle between the two parallel sliding rails 211, an extension arm 213 forwardly extended from a front end thereof, a tooth rack 2131 formed integral with and extending along an inner side of the extension arm 213, a longitudinal rib 2132 located on the extension arm 213 in axial alignment with one sliding rail 211, and a sliding groove 214 disposed adjacent to the other sliding rail 211 in a parallel manner. The two clamping members 23 are respectively coupled to the two adjustment plates 21 by the two pivot joints 22, each defining therein a clamping hole 230. The rotating wheel 24 is set in between the two adjustment plates 21, comprising a center axle hole 240, an inside annular flange 241 formed in one end of the center axle hole 240 and an external ring gear 242 formed integral with the periphery thereof.

When assembling the adjustable device holder, couple the sliding rails 211 of the two adjusts adjustment plates 21 of the adjustment module 2 to the respective parallel sliding grooves 111 of the bottom panel 11 to face the engagement portions 212 of the adjustment plates 21 toward the bottom release member 124 and positioning member 126 of the cover panel 12 and to keep the extension arms 213 of the two adjustment plates 21 at two opposite lateral sides relative to the shaft column 112 of the bottom panel 11 and to have the longitudinal rib 2132 of the extension arm 213 of one adjustment plate 21 be coupled to the sliding groove 214 of the other adjustment plate 21, and then attach the center axle hole 240 of the rotating wheel 24 onto the shaft column 112 of the bottom panel 11 to keep the inside annular flange 241 of the rotating wheel 24 at the bottom side of the stop blocks 1121 of the shaft column 112 and to have the external ring gear 242 of the rotating wheel 24 be meshed between the tooth racks 2131 of the extension arms 213 of the respective adjustment plates 21, and thus the adjustment module 2 is accommodated in the accommodation chamber 10 with the clamping members 23 respectively suspending outside the access holes 101 of the holder base 1.

Figure 4:
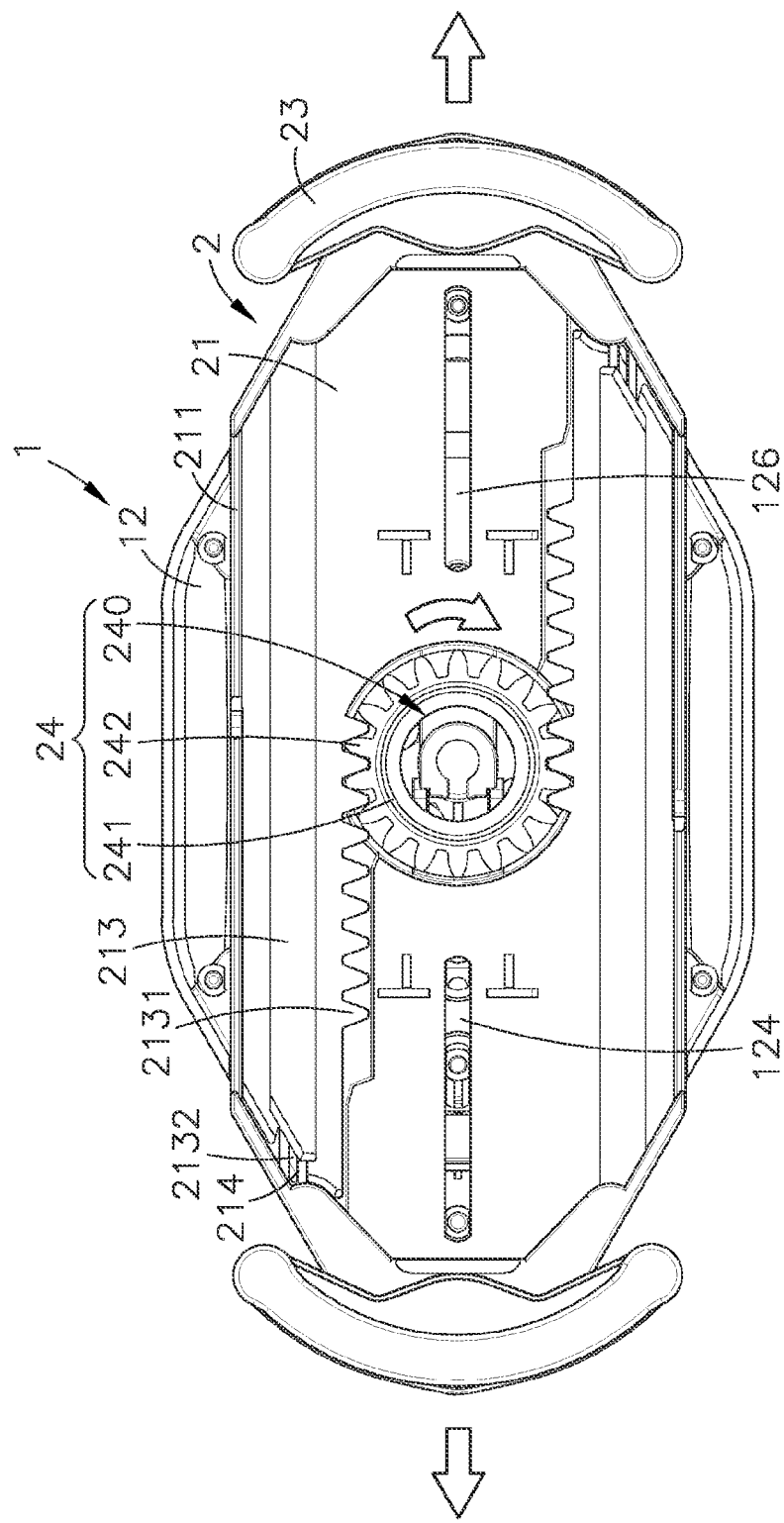
FIG. 4 is a sectional top view of the present invention before adjustment of the adjustable device holder.
Figure 5:
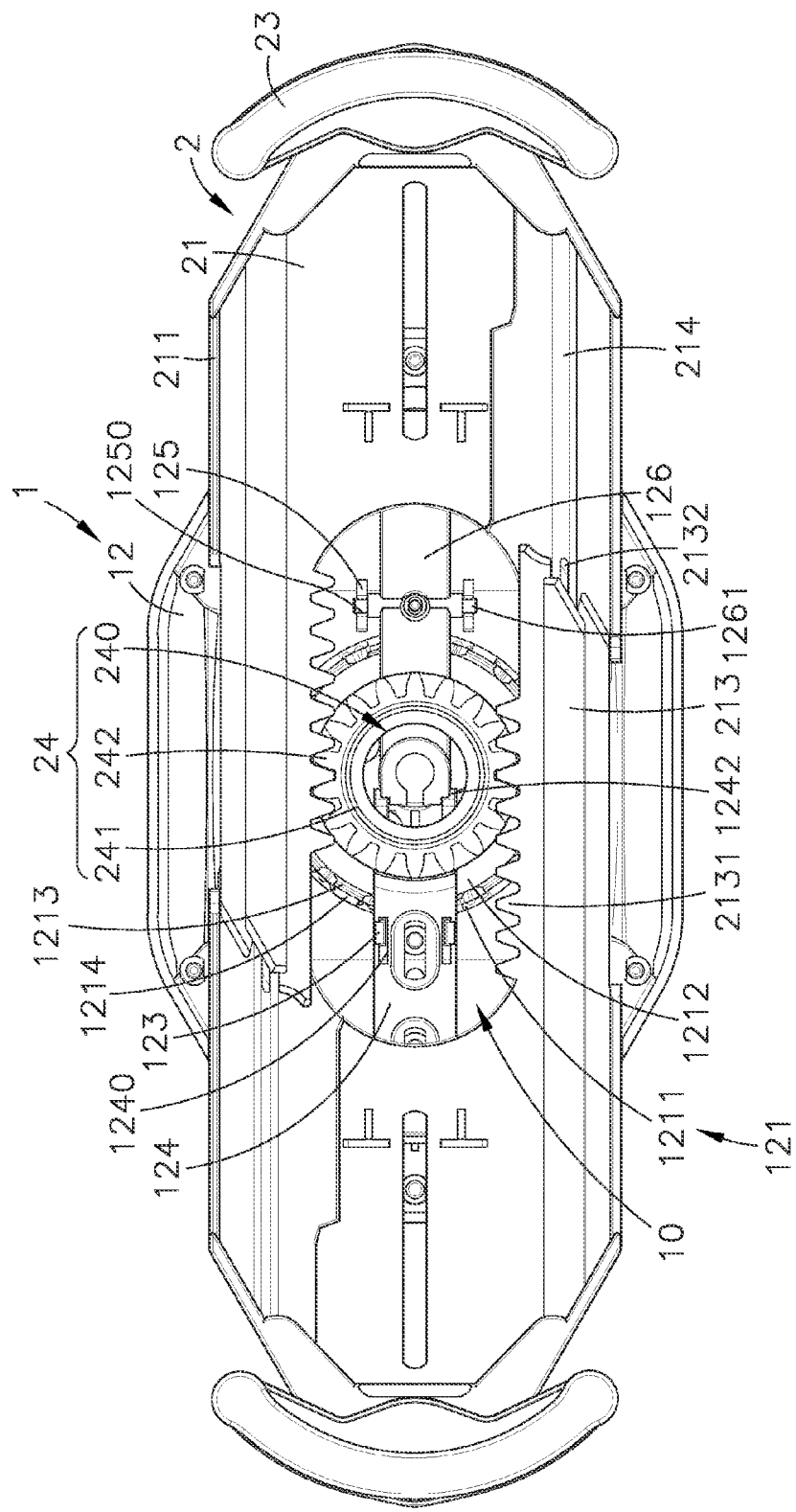
FIG. 5 corresponds to FIG. 4 illustrating the adjustable device holder adjusted.
Figure 6:
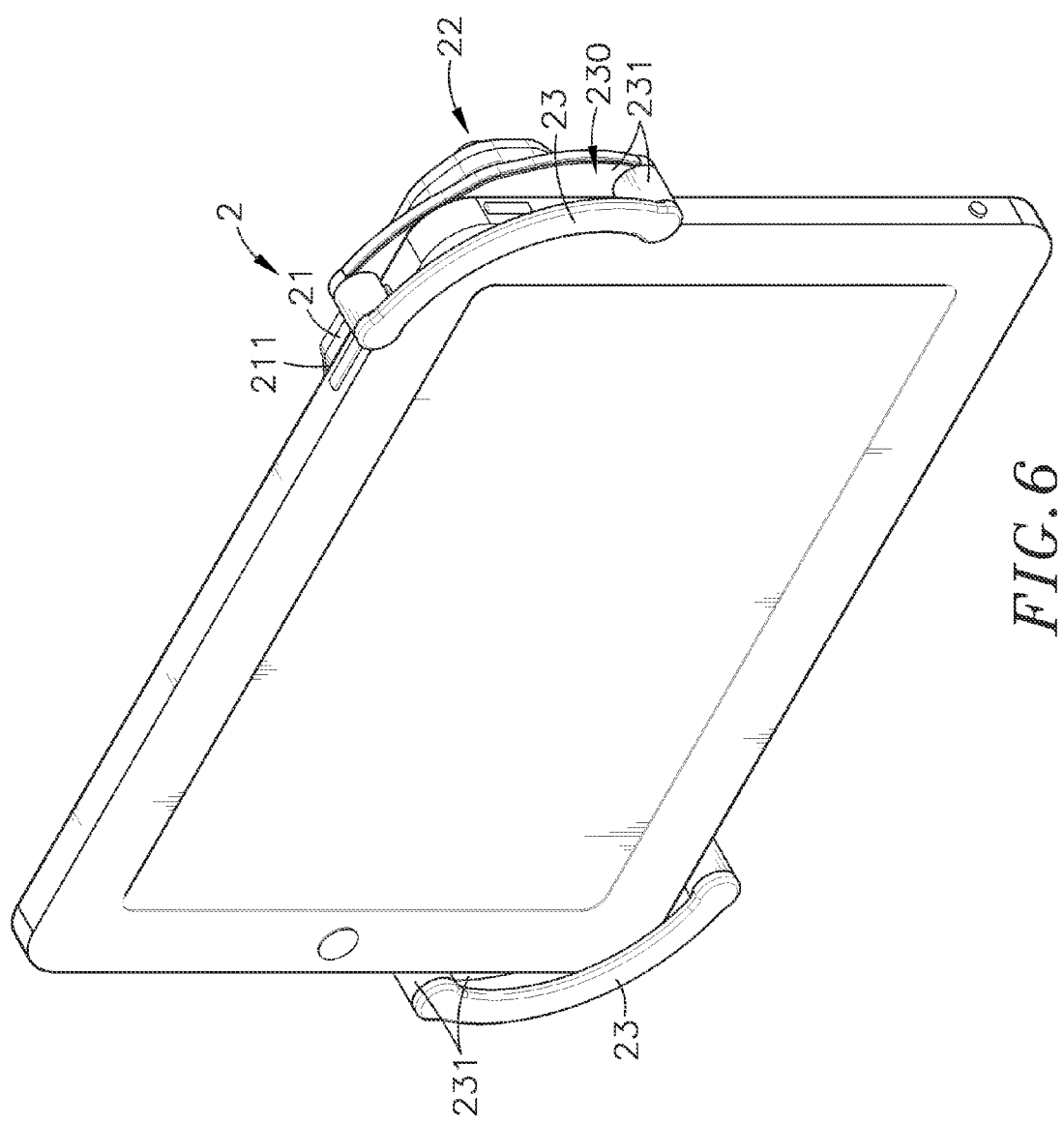
FIG. 6 illustrates an application example of the adjustable device holder in accordance with the present invention.

Referring to FIGS. 4-6 and FIGS. 1-3 again, when using the adjustable device holder, affix the mounting structure 121 of the cover panel 12 of the holder base 1 to an external support means, for example, an exhibition rack at a tabletop or work platform, and then couple the engagement blocks 123 of the cover panel 12 to the respective sliding slots 1240 of the bottom release member 124, and then insert the operating rod 1241 of the bottom release member 124 into the operating hole 122 of the cover panel 12 with the sliding slots 1240 respectively slidably coupled to the engagement block 123 to stop the press portion 1242 against the bearing portion 1262 of the positioning member 126, enabling the pivot rods 1261 of the positioning member 126 to be rotated in the respective pivot holes 1250 of the locating plates 125 to move the engagement portion 1264 of the positioning member 126 away from the engagement portions 212 of the adjustment plates 21 of the adjustment module 2. At this time, the tooth racks 2131 of the extension arms 213 of the adjustment plates 21 are movably meshed with the external ring gear 242 of the rotating wheel 24 around the shaft column 112 for allowing adjustment of the sliding rails 211 of the two adjustment plates 21 along the two parallel sliding grooves 111 of the mounting structure 11 in direction away from the access holes 101 of the holder base 1. Thereafter, set a predetermined mobile electronic device in between the two clamping members 23 at the adjustment plates 21 of the adjustment module 2.

After the predetermined mobile electronic device is set in between the two clamping members 23 at the adjustment plates 21 of the adjustment module 2, move the sliding rails 211 of the two adjustment plates 21 along the two parallel sliding grooves 111 of the mounting structure 11 toward the access holes 1011 of the holder base 1 to force the clamping holes 230 of the two clamping members 23 at the adjustment plates 21 into engagement with two opposite corner edges of the mobile electronic device, and then pull the operating rod 1241 of the bottom release member 124 along the operating hole 122 of the cover panel 12 toward the outside to release the press portion 1242 of the bottom release member 124 from the bearing portion 11262 of the positioning member 126, and then operate the knob 132 of the control member 13 to stop the push rod 131 of the control member 13 against the pressure surface 1263 of the positioning member 126, forcing the engagement portion 1264 of the positioning member 126 into positive abutment against the engagement portions 212 of the adjustment plates 21 of the adjustment module 2 and preventing displacement of the adjustment plates 21 relative to the holder base 1.

The adjustable device holder of the present invention enables the adjustment of the sliding rails 211 of the two adjustment plates 21 to be respectively slidably coupled the two parallel sliding grooves 111 of the mounting structure 11 and the tooth racks 2131 of the extension arms 213 of the adjustment plates 21 of the two adjustment plates 21 to be movably meshed with the external ring gear 242 of the rotating wheel 24 around the shaft column 112 for allowing adjustment of the sliding rails 211 of the two adjustment plates 21 along the two parallel sliding grooves 111 of the mounting structure 11 in direction toward or away from the access holes 101 of the holder base 1 so that the clamping holes 230 of the two clamping members 23 at the adjustment plates 21 can be adjustably forced into engagement with two opposite corner edges of one of a variety of different sizes of mobile electronic devices.

Further, after a predetermined mobile electronic device is secured in between the clamping holes 230 of the two clamping members 23 at the adjustment plates 21, the user can press the knob 132 of the control member 13 into the locking position (or use the key to lock the knob 132 of the control member 13 in the locking position), stopping the push rod 131 of the control member 13 tightly against the pressure surface 1263 of the positioning member 126 to prohibit displacement of the adjustment plates 21 of the adjustment module 2 relative to the holder base 1. Thus, the mobile electronic device is locked to the adjustable device holder at the exhibition rack.

Further, the holder base 1 further comprises a rotating hole 1210 formed in the mounting structure 121 of the cover panel 12, an internal gear 1211 formed integral with a part of the mounting structure 121 within the rotating hole 1210, and a rotating member 1212 rotatably capped on the rotating hole 1210. The rotating member 1212 comprises a plurality of equiangularly spaced and downwardly extending retaining strips 1213, a locating block 1214 located on an outer side of each retaining strip 1213 and meshed with the internal gear 1211. The rotating member 1212 is affixed to the external exhibition rack, allowing the loaded mobile electronic device with the adjustment module 2 and the cover panel 12 of the holder base 1 to be adjusted relative to the rotating member 1212 and the exhibition rack to the desired angle.

Further, the engagement portion 1264 of the positioning member 126 and the engagement portions 212 of the adjustment plates 21 of the adjustment module 2 can be serrated or grooved for abutment therebetween positively. Thus, operating the knob 132 of the control member 13 can tightly stop the push rod 131 of the control member 13 against the pressure surface 1263 of the positioning member 126 to keep the engagement portion 1264 of the positioning member 126 in abutment against the engagement portions 212 of the adjustment plates 21 of the adjustment module 2 tightly, preventing disengagement between the clamping members 23 of the adjustment module 2 and the loaded mobile electronic device.

Further, each of the aforesaid two pivot joints 22 comprises a pivot hole 220 located on one respective adjustment plate 21, a tubular pivot pin 221 located on one respective clamping member 23, and a rivet 222 fastened to the tubular pivot pin 221 to pivotally secure the tubular pivot pin 221 to the pivot hole 220. Thus, the clamping members 23 can be biased relative to the adjustment plates 21 to fit the size of the loaded mobile electronic device.

Further, each clamping member 23 of the adjustment module 2 has a cushion pad 231 (made of rubber, soft plastics or silicon rubber) fixedly bonded thereto around the respective clamping hole 230 for direct contact with the loaded mobile electronic device, protecting the loaded mobile electronic device against scratching damage.

Further, the longitudinal rib 2132 of one extension arm 213 of one adjustment plate 21 of the adjustment module 2 is slidably coupled to the sliding groove 214 of the other adjustment plate 21 so that the two adjustment plates 21 can be smoothly and stably moved relative to each other. Further, the longitudinal ribs 2132 enhance the structural strength of the respective extension arms 213, preventing breaking of the extension arms 213 upon movement of the tooth racks 2131 of the extension arms 213 of the adjustment plates 21 of the two adjustment plates 21 relative to the external ring gear 242 of the rotating wheel 24.

As described above, the invention provides an adjustable device holder comprising a holder base 1, which comprises a bottom panel 11, a cover panel 12 covering the bottom panel 11, an accommodation chamber 10 defined between the bottom panel 11 and the cover panel 12, two access holes 101 respectively disposed in communication between the accommodation chamber 10 and the atmosphere at two opposite lateral sides, two parallel sliding grooves 111 located on an inner wall of the bottom panel 11 and a shaft column 112 located at the bottom panel 11 between the two parallel sliding grooves 111, and an adjustment module 2 adjustably coupled to the holder base 1 for holding any of a variety of different sizes of mobile electronic devices. The adjustment module 2 comprises two adjustment plates 21, two pivot joints 22, two clamping members 23 respectively pivotally connected to the adjustment plates 21 by the two pivot joints 22 for holding a mobile electronic device therebetween, and a rotating wheel 24 coupled to the shaft column 112 at the bottom panel 11 of the holder base 1 and having an integrated external ring gear 242. Each adjustment plate 21 comprises two parallel sliding rails 211 respectively slidably coupled to the parallel sliding grooves 111 at the bottom panel 11 of the holder base 1, an extension arm 213 forwardly extended from a front end thereof, and a tooth rack 2131 formed integral with and extending along an inner side of the extension arm 213. The external ring gear 242 of the rotating wheel 24 is meshed between the tooth racks 2131 of the adjustment plates 21 of the adjustment module 2. Thus, the two adjustment plates 21 can be moved along the parallel sliding grooves 111 at the bottom panel 11 of the holder base 1 relative to each other to adjust the gap between the two clamping members 23 subject to the size of the mobile electronic device to be held, enabling the mobile electronic device to be firmly secured in the clamping holes 230 of the clamping members 23.

In conclusion, the adjustable device holder of the invention has the advantages and features as follows:

1. The tooth racks 2131 of the adjustment plates 21 of the adjustment module 2 are movably and bilaterally meshed with the external ring gear 242 of the rotating wheel 24 so that the two adjustment plates 21 can be moved along the parallel sliding grooves 111 at the bottom panel 11 of the holder base 1 relative to two access holes 101 to adjust the gap between the two clamping members 23 subject to the size of the mobile electronic device to be held, enabling the mobile electronic device to be firmly secured in the clamping holes 230 of the clamping members 23.

2. The knob 132 of the control member 13 can be operated to tightly stop the push rod 131 of the control member 13 against the pressure surface 1263 of the positioning member 126 to keep the engagement portion 1264 of the positioning member 126 in abutment against the engagement portions 212 of the adjustment plates 21 of the adjustment module 2 tightly, preventing disengagement between the clamping members 23 of the adjustment module 2 and the loaded mobile electronic device.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable device holder, comprising:
a holder base comprising a bottom panel, a cover panel covering said bottom panel, an accommodation chamber defined between said bottom panel and said cover panel, two access holes bilaterally defined between said bottom panel and said cover panel and disposed in communication between said accommodation chamber and the atmosphere and a control member inserted through said cover panel, a shaft column located at a center of an inner wall thereof, a mounting structure located at a center thereof, an operating hole cut through opposing top and bottom walls thereof and disposed adjacent to one lateral side of said mounting structure, a bottom release member, said bottom release member comprising an operating rod inserted through said operating hole of said cover panel and a press portion extended from a front side thereof and suspending in a bottom side relative to said mounting structure, a positioning member, said positioning member comprising a bearing portion located at a front end thereof for stopping against said press portion of said bottom release member and a pressure surface and an engagement portion respectively located at opposing top and bottom sides of an opposing rear end thereof, said control member comprising a push rod extended from a bottom side thereof and stopped against said pressure surface of said positioning member and a knob located at a top side thereof and suspending outside said cover panel; and an adjustment module adjustably mounted at said holder base for holding a loaded mobile electronic device, said adjustment module comprising two adjustment plates, two pivot joints, two clamping members respectively pivotally connected to said adjustment plates by said pivot joints, and a rotating wheel rotatably coupled to said shaft column of said bottom panel, each said adjustment plate comprising two parallel sliding rails respectively slidably coupled to sliding grooves of said bottom panel, an engagement portion disposed between said two parallel sliding rails and facing toward one of said bottom release member and said positioning member of said cover panel, an extension arm forwardly extended from a front end thereof, a tooth rack formed integral with and extending along an inner side of said extension arm, each said clamping member defining therein a clamping hole for securing a mobile electronic device, said rotating wheel comprising a center axle hole rotatably coupled to said shaft column of said bottom panel and an external ring gear formed integral with a periphery thereof and meshed with the tooth racks of said adjustment plates.

2. The adjustable device holder as claimed in claim 1, wherein said bottom panel further comprises a plurality of stop blocks spaced around a periphery of said shaft column; said rotating wheel of said adjustment module further comprises an inside annular flange formed in one end of the center axle hole thereof for stopping against said stop blocks of said bottom panel.

3. The adjustable device holder as claimed in claim 1, wherein said holder base further comprises a rotating hole formed in said mounting structure of said cover panel, an internal gear formed integral with a part of said mounting structure within said rotating hole, and a rotating member rotatably capped on said rotating hole, said rotating member comprising a plurality of equiangularly spaced and downwardly extending retaining strips, a locating block located on an outer side of each said retaining strip and meshed with said internal gear.

4. The adjustable device holder as claimed in claim 1, wherein said cover panel of said holder base further comprises a plurality of engagement blocks located on a bottom wall thereof at two opposite sides of said operating hole in a parallel manner; said bottom release member further comprises a plurality of sliding slots spaced around said operating rod and respectively slidably coupled to said engagement blocks of said cover panel.

5. The adjustable device holder as claimed in claim 1, wherein said cover panel of said holder base further comprises two locating plates extended from the bottom wall thereof adjacent to an opposite lateral side of said mounting structure, each said locating plate defining therein a pivot hole, said positioning member comprising two pivot rods symmetrically disposed at two opposite lateral sides thereof and respectively pivotally coupled to the pivot holes of said two locating plates.

6. The adjustable device holder as claimed in claim 1, wherein each said adjustment plate of said adjustment module further comprises a longitudinal rib located on the extension arm thereof, and a sliding groove disposed in parallel to said longitudinal rib, the longitudinal rib of one said adjustment plate being coupled to the sliding groove of the other said adjustment plate.

7. The adjustable device holder as claimed in claim 1, wherein each said pivot joint comprises a pivot hole located on one respective said adjustment plate, a tubular pivot pin located on one respective said clamping member, and a rivet fastened to said tubular pivot pin to pivotally secure said tubular pivot pin to the pivot hole of the respective said adjustment plate.

8. The adjustable device holder as claimed in claim 1, wherein each said clamping member of said adjustment module comprises a cushion pad fixedly bonded thereto around the clamping hole thereof.

\* \* \* \* \*